US010698826B1

(12) United States Patent
McLeran et al.

(10) Patent No.: US 10,698,826 B1
(45) Date of Patent: Jun. 30, 2020

(54) SMART FILE LOCATION (75) Inventors: Daniel Robert McLeran, Loveland, CO (US); Steven Scott Williams, Longmont, CO (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 1744 days.

(21) Appl. No.: 13/440,022

(22) Filed: Apr. 5, 2012

Related U.S. Application Data (60) Provisional application No. 61/584,188, filed on Jan. 6, 2012, provisional application No. 61/584,196, filed on Jan. 6, 2012, provisional application No. 61/584,197, filed on Jan. 6, 2012, provisional application No. 61/584,201, filed on Jan. 6, 2012, provisional application No. 61/584,204, filed on Jan. 6, 2012, provisional application No. 61/584,195, filed on Jan. 6, 2012.

(51) Int. Cl.
*G06F 12/0862* (2016.01)

(52) U.S. Cl.
CPC .... *G06F 12/0862* (2013.01); *G06F 2212/602* (2013.01); *G06F 2212/6028* (2013.01)

(58) Field of Classification Search
None
See application file for complete search history.

(56) References Cited

U.S. PATENT DOCUMENTS

| | | | |
|---|---|---|---|
| 6,463,509 B1 * | 10/2002 | Teoman | G06F 9/4401 711/113 |
| 6,625,150 B1 | 9/2003 | Yu | |
| 6,834,329 B2 | 12/2004 | Sasaki | |
| 6,842,510 B2 | 1/2005 | Sakamoto | |
| 7,380,158 B2 | 5/2008 | Totolos | |
| 7,421,710 B2 | 9/2008 | Qi et al. | |
| 7,457,880 B1 | 11/2008 | Kim | |
| 7,464,246 B2 | 12/2008 | Gill | |
| 7,464,250 B2 | 12/2008 | Dayan | |
| 7,500,063 B2 | 3/2009 | Zohar | |
| 7,526,598 B2 | 4/2009 | Stern et al. | |
| 7,600,244 B2 | 10/2009 | Maruyama | |
| 7,826,161 B2 * | 11/2010 | Riedel | G11B 5/02 360/48 |

(Continued)

OTHER PUBLICATIONS

Operating system (OS) 1 page From "Hargrave's Communications Dictionary, Wiley" Copyright © 2001 by the Institute of Electrical and Electronics Engineers, Inc.*

(Continued)

*Primary Examiner* — Jared I Rutz
*Assistant Examiner* — Marwan Ayash
(74) *Attorney, Agent, or Firm* — Setter Roche LLP; Christian W Best (57) ABSTRACT

The disclosure is related to storage devices employing file-aware drivers. In one example, a device may comprise a driver configured to retrieve file system information related to an input/output (I/O) command, determine storage attributes based on the file system information, and store selected data in a preferred region of a data storage medium based on the storage attributes. Another embodiment may be a method comprising inspecting characteristics of an I/O request for a file, setting storage attributes for the file based on if the file is preferred, and storing the file on a data storage medium based on the storage attributes.

24 Claims, 5 Drawing Sheets

(56) References Cited

U.S. PATENT DOCUMENTS

| | | | |
|---|---|---|---|
| 7,877,546 B2 | 1/2011 | Zohar | |
| 8,019,938 B2 | 9/2011 | Flynn | |
| 8,064,464 B2 | 11/2011 | Knazik | |
| 8,073,674 B2 | 12/2011 | Gehr et al. | |
| 8,166,164 B1 | 4/2012 | Luna | |
| 8,499,120 B2 | 7/2013 | Furuhjelm | |
| 2005/0232153 A1* | 10/2005 | Bishop et al. | 370/235 |
| 2006/0050714 A1 | 3/2006 | Blasco Claret | |
| 2006/0075164 A1 | 4/2006 | Ooi | |
| 2007/0136541 A1* | 6/2007 | Herz et al. | 711/162 |
| 2008/0016273 A1 | 1/2008 | Dayan | |
| 2008/0162821 A1 | 7/2008 | Duran et al. | |
| 2008/0307158 A1* | 12/2008 | Sinclair | G06F 12/0246 711/103 |
| 2008/0307192 A1* | 12/2008 | Sinclair | G06F 12/0246 711/218 |
| 2009/0112931 A1 | 4/2009 | Wang | |
| 2010/0023712 A1* | 1/2010 | Yamaguchi et al. | 711/158 |
| 2010/0153474 A1* | 6/2010 | Raines et al. | 707/812 |
| 2010/0169540 A1* | 7/2010 | Sinclair | G06F 12/0246 711/103 |
| 2011/0185043 A1 | 7/2011 | Zeller | |
| 2011/0295915 A1* | 12/2011 | Ejiri | G06F 17/30132 707/821 |
| 2012/0215965 A1 | 8/2012 | Inada | |
| 2014/0075143 A1 | 3/2014 | Matsuya | |

OTHER PUBLICATIONS

Non-Final Office Action, dated Dec. 20, 2013, U.S. Appl. No. 13/440,228,Temporal File Defragment, Daniel Robert McLeran.
Non-Final Office Action, dated Jan. 7, 2014, U.S. Appl. No. 13/440,245,Cache File Preloading, Daniel Robert McLeran.
Non-Final Office Action, dated Jan. 6, 2014, U.S. Appl. No. 13/440,450,File-Aware Caching Driver, Daniel Robert McLeran.
Non-Final Office Action, dated Apr. 26, 2013, U.S. Appl. No. 13/440,332,File-Aware Priority Driver, Daniel Robert McLeran.
Final Office Action, dated Oct. 25, 2013, U.S. Appl. No. 13/440,332,File-Aware Priority Driver, Daniel Robert McLeran.
Advisory Action, dated Jan. 15, 2014, U.S. Appl. No. 13/440,332,File-Aware Priority Driver, Daniel Robert McLeran.
Non-Final Office Action, dated Apr. 26, 2013, U.S. Appl. No. 13/440,285,High Priority Read and Write, Daniel Robert McLeran.
Non-Final Office Action, dated Oct. 24, 2013, U.S. Appl. No. 13/440,285,High Priority Read and Write, Daniel Robert McLeran.
Non-Final Office Action, dated Jan. 15, 2014, U.S. Appl. No. 13/440,285,High Priority Read and Write, Daniel Robert McLeran.
Final Office Action, dated Feb. 25, 2014, U.S. Appl. No. 13/440,285,High Priority Read and Write, Daniel Robert McLeran.

* cited by examiner

SMART FILE LOCATION

CROSS REFERENCE TO RELATED APPLICATIONS

The present application claims priority to pending U.S. provisional patent applications Ser. No. 61/584,188, filed Jan. 6, 2012, entitled "Smart File Location;" Ser. No. 61/584,195, filed Jan. 6, 2012, entitled "Temporal File Defragment;" Ser. No. 61/584,196, filed Jan. 6, 2012, entitled "Cache File Preloading;" Ser. No. 61/584,197, filed Jan. 6, 2012, entitled "File-Aware Caching Driver;" Ser. No. 61/584,201, filed Jan. 6, 2012, entitled "File-Aware Priority Driver;" and Ser. No. 61/584,204, filed Jan. 6, 2012, entitled "High Priority Read and Write," the contents of which are hereby incorporated by reference in their entirety.

BACKGROUND

The organization of files stored on data storage devices (DSDs) may be limited by the information available to the device from a host system. In some data storage systems, the data storage device receives very limited information from the host about files, such as file size and a Logical Block Address. Therefore, systems and methods are needed for improving file placement and organization.

SUMMARY

A device may comprise a driver configured to retrieve file system information related to a structured input/output (I/O) command from a host, determine storage attributes based on the file system information, and store selected data in a preferred region of a data storage medium based on the storage attributes.

In another embodiment, a system may comprise a host including at least one driver executable by a processor, the driver configured to intercept a data input/output (I/O) request from an operating system to a data storage device, obtain file system information from the operating system about the I/O request, determine whether the file is preferred and should be moved to a preferred region of a first memory of the data storage device based on the file system information, and set storage attributes accessible to the data storage device based on the determination.

Another embodiment may be a method comprising inspecting characteristics of a data input/output (I/O) request for a file, determining if the file is preferred based on the characteristics, setting storage attributes for the file based on the determination, and storing the file on a data storage medium based on the storage attributes.

DETAILED DESCRIPTION

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure.

Host devices may send data read or write requests to data storage devices in the form of structured input/output (I/O) commands or requests. As used herein, a structured command is a command defined by an interface-standard command format, such as a read or write command of a data storage interface standard (such as SATA). A structured command must be in the form of a data structure compatible with the interface of a data storage device. Operating system information (or file system information), such as information specific to files or operation threads, are not included as part of the structured I/O command request. A thread may be a unit of processing on an operating system, such that a single application may consist of numerous threads running simultaneously.

Data storage devices may benefit from receiving additional information about a file or I/O operation thread from a host system. This may be improved by using drivers to communicate between devices. Drivers can be computer programs designed to facilitate communication or interaction between applications or other programs and hardware devices (e.g. between a host computer application and a data storage device). A kernel may be a part of the operating system that acts as a "bridge" between computer applications and the hardware devices of a system, such as the CPU, memory, and other hardware components. In some embodiments, systems may be improved by a system of drivers operating in the kernel of the host operating system to collect or retrieve data about a file or input/output (I/O) operation thread, and associate corresponding storage attributes with the file or operation. The data storage device can use the storage attributes set by the drivers to make informed decisions regarding files or operations, potentially improving response times, reducing latency, or otherwise improving device performance. As an example, file or thread data could be used to select files or information to store in a specific location in a system's memory, based on the type or importance of the files.

Figure 1:
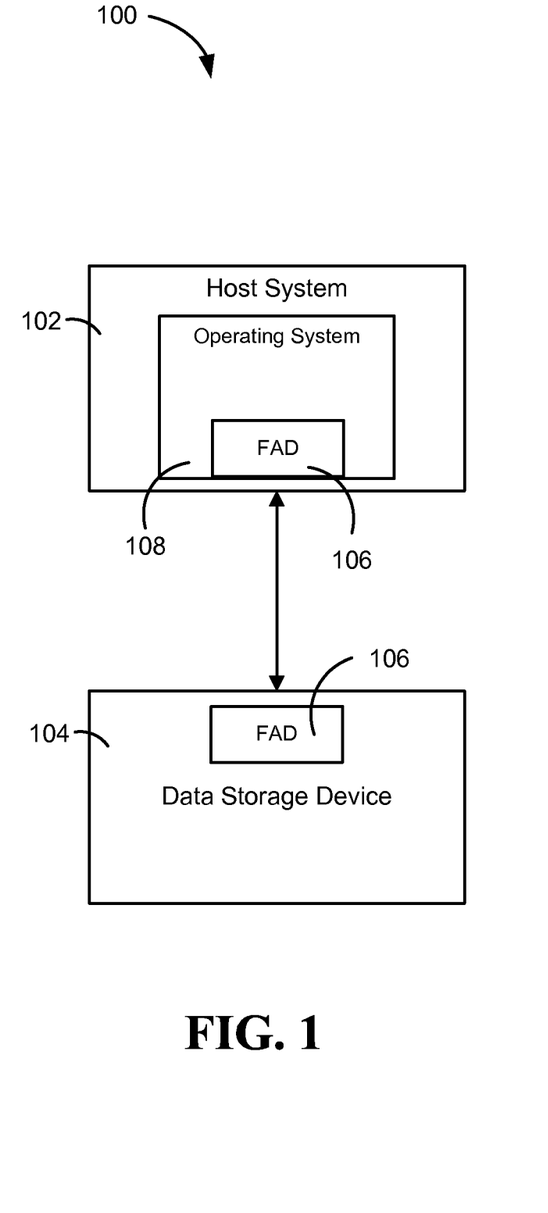
FIG. 1 is a diagram of an illustrative embodiment of a system for smart file location.

FIG. 1 depicts an embodiment of a system for smart file location generally designated 100. The system 100 may include a host 102 and a data storage device (DSD) 104. The host 102 may also be referred to as the host system or host computer. The host 102 can be a desktop computer, a laptop computer, a server, a tablet computer, a telephone, a music player, another electronic device, or any combination thereof. Similarly, the DSD 104 may be any of the above-listed devices, or any other device which may be used to store or retrieve data. The host 102 and DSD 104 may be connected by way of a wired or wireless connection, or by a local area network (LAN) or wide area network (WAN). In some embodiments, the DSD 104 can be a stand-alone device not connected to a host 102, or the host 102 and DSD 104 may both be part of a single unit.

The host 102 can include one or more file-aware drivers (FAD) 106. The FAD 106 may be drivers running in the kernel of the operating system 108 of the host 102 and may facilitate operations between the host 102 and the DSD 104. The FAD 106 can comprise software running on the host device, configurable controllers, or circuits designed to implement the functions described herein. In some embodiments, some or all of the FAD 106 may be incorporated into the DSD 104. For example, a policy engine driver could be incorporated on the DSD 104, while a file system filter driver and a table driver could be implemented on the host 102.

When the host 102 transmits a structured input/output (I/O) command to the DSD 104, the FAD 106 can monitor or intercept file activity in the operating system 108, including data about files themselves or the applications or threads utilizing or requesting the files. This file system data may be used by the FAD 106 or DSD 104 to improve performance or operability between the host 102 and the DSD 104. For example, the FAD 106 may send the data to the DSD 104 directly, or use the data to assign storage attributes to the I/O command or associated file. These file system data or storage attributes can be sent to the DSD 104 as part of or separately from the structured I/O command itself. The DSD 104 may use the data or storage attributes to intelligently determine where files should be stored in the physical memory of the DSD.

Figure 2:
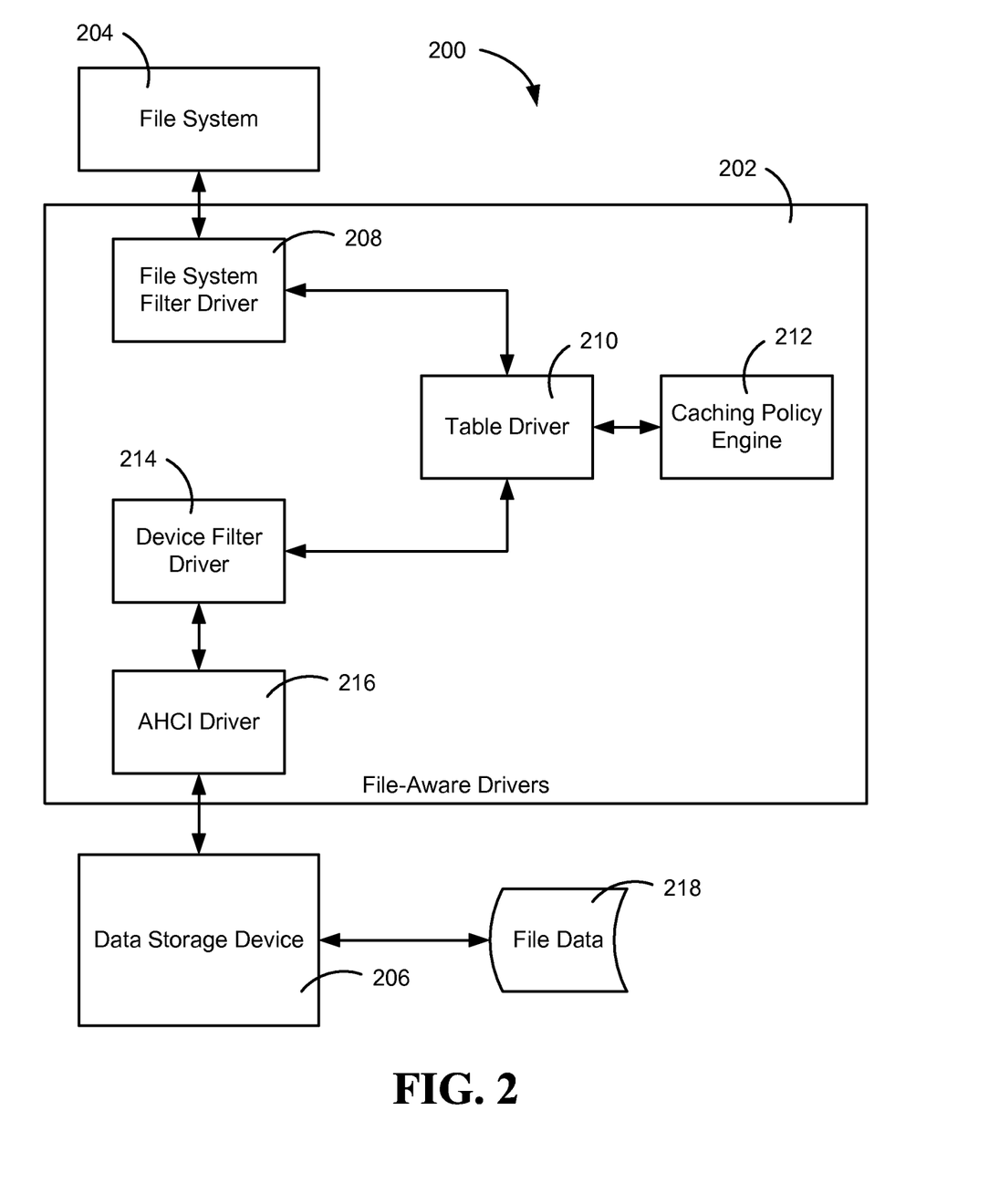
FIG. 2 is a diagram of an another illustrative embodiment of a system for smart file location.

FIG. 2 depicts a diagram of a system for smart file location generally designated 200. The system 200 may include one or more file-aware drivers (FAD) 202, a file system 204, and a data storage device (DSD) 206 which can store, retrieve, or modify data file(s) 218. The file system 204 may be the file system of a host device, used for organizing, storing, and retrieving data. Example file systems may include FAT, NTFS, or HFS Plus. The DSD 206 may be any of the devices listed for the data storage device 104, or any other device for data storage.

In the embodiment depicted in FIG. 2, the file-aware drivers (FAD) 202 may consist of a system of device drivers running in the operating system of a host device, which system may include a file system filter driver 208, a table driver 210, a policy engine 212, a device filter driver 214, and an Advanced Host Controller Interface (AHCI) driver 216. In some embodiments, the FAD 202 may be software, one or more programmable controllers, circuits, CPUs, or any combination of elements capable of detecting attributes of file activity within a system and associating these attributes with files or I/O operations in such a way as to affect a behavior of the data storage device 206.

The file system 204 may initiate I/O requests to read or write data to the data storage device 206. The file system filter driver 208 can interact with the file system 204 to intercept or retrieve file activity from the operating system. This may include gathering information about file(s) such as the file name, file path, file extension, file size, or logical block address (LBA) for the entire file. The intercepted file activity may also include other information, such as the system power source (e.g. A/C power or battery power), or the name or identifier (e.g. the type of accessing program, such as .exe or .dll) of the accessing executable, other information, or any combination thereof. The file system filter driver 208 may then pass relevant file information to the policy engine 212 through the table driver 210.

As an example, the host operating system may initiate a structured I/O command requesting a block of file data 218 from the DSD 206 using a logical block address (LBA) associated with the block of data. The file system filter 208 may determine the file path and file size of the file associated with the requested data 218, as well as the type of program requesting the data. In one example, this file system information associated with the structured I/O command may be passed along with the data I/O request to the policy engine 212 by way of the table driver 210. In addition, the file system filter 208 may determine other information available to a host operating system that is not part of a structured I/O command.

The table driver 210 may maintain the relationship between a file or piece of data 218, the thread ID of the processing thread requesting the input/output (I/O) operation, and the file information from the file system filter driver 208 or the storage attributes set by the policy engine 212. In some embodiments, the table driver 210 may only maintain the relationship between the file and the file information, or between the thread ID and the file information. The table driver 210 may maintain these relationships in a table, database, self-contained data packets, other formats, or a combination thereof The policy engine (PE) 212 can inspect the information collected by the file system filter driver, such as file extension, file size, file path, creation attributes, and the name of the accessing executable. This information may be sent to the PE 212 by the table driver 210, or the PE 212 may independently inspect a table, database, or other data structure maintained by the table driver 210. Upon inspection of the file properties, the PE 212 can determine whether to set storage attributes for the current file and/or I/O operation thread immediately, or to delay setting storage attributes until later. For example, if file information is unavailable or insufficient at the file system filter driver 208 level, the PE 212 may request to be called again at the device driver filter 214 level. Furthermore, storage attributes may be set at one or more points in the lifecycle of a file object, such as on first access of the file, subsequent accesses, pre-read, pre-write, or other points. When storage attributes have been set, the table driver 210 may then update to maintain the relationship between the file or operation thread and the storage attributes set by the PE 212.

The storage attributes set by the PE 212 can be used to determine which files are high value or preferred, or where files should be stored, or for other operations of the data storage device 206. The PE 212 may select storage attributes based upon configurable settings. For example, a user of the host system 102 or data storage device 104 may be able to configure which types of attributes, files, or program requests should be labeled as "high value" for storage purposes and should be stored in memory so as to provide faster access or higher reliability, such as labeling data from I/O operations from .exe executable programs as high value. In some embodiments, the PE 212 may have programmed or automatic settings on how to assign storage attributes. In other embodiments, the PE 212, the system of drivers 202, or the data storage device 206 may be configured to monitor file usage and data access and modify storage policies according to usage.

If the storage attributes have already been set by the policy engine (PE) 212, the device filter driver 214 may retrieve the storage attributes from the table driver 210. If the PE 212 has not yet set the storage attributes, the device filter driver 214 may request storage attributes from the PE 212 through the table driver 210. The device filter driver 214 may provide any additional available information to the PE 212 to facilitate the selection of storage attributes. Once selected, the device filter driver 214 can pass the storage attributes to the Advanced Host Controller Interface (AHCI) driver 216. Depending on the type of ACHI driver 216 in the system, the device filter driver 214 may do this by placing the storage attributes into a Small Computer System Interface (SCSI) Request Block (SRB), a Command Descriptor Block, or other block of data and instructions for the data storage device (DSD) 206 recognized by the AHCI driver 216.

The Advanced Host Controller Interface (AHCI) driver 216 can receive the storage attributes from the device filter driver 214. If the storage attributes were sent as part of an SCSI Request Block (SRB) or similar data block, the AHCI driver 216 can copy out the attributes. The AHCI driver may then pass the storage attributes to the data storage device 206. As an example, the AHCI driver 216 may copy the storage attributes into a Frame Information Structure (FIS), which is a block of data for Direct Memory Access (DMA) reads and writes. The storage attributes may be sent to the data storage device separate from the structured I/O command issued by the host.

After receiving the storage attributes, the data storage device 206 may use the attributes to determine data storage behavior or for other functions. For example, it may use the storage attribute values to determine where to store data on a data storage medium, with certain storage attribute values resulting in in data being saved to high-reliability or fast-access storage locations, and other values resulting in other or no special treatment as to storage location.

The system of FAD 202 depicted in FIG. 2 is an illustrative embodiment only, and it should be apparent to one skilled in the art that the functions described could be performed by more or fewer drivers, or that some functionality could be implemented as part of the data storage device rather than in the host system. For example, a single driver could perform all the functions of obtaining file information, assigning storage attributes, maintaining an association table, and passing the information to a data storage device. Alternately, drivers could obtain file information and pass it to a data storage device, where storage attributes would then be selected. In other embodiments, file system information could be determined and stored in a table on the host. The data storage device could access and retrieve the file system information from the host and set storing attributes based on the file system information. Removing, adding, consolidating, or restructuring the drivers could eliminate the need for some functions or behaviors described herein, or add additional requirements.

Figure 3:
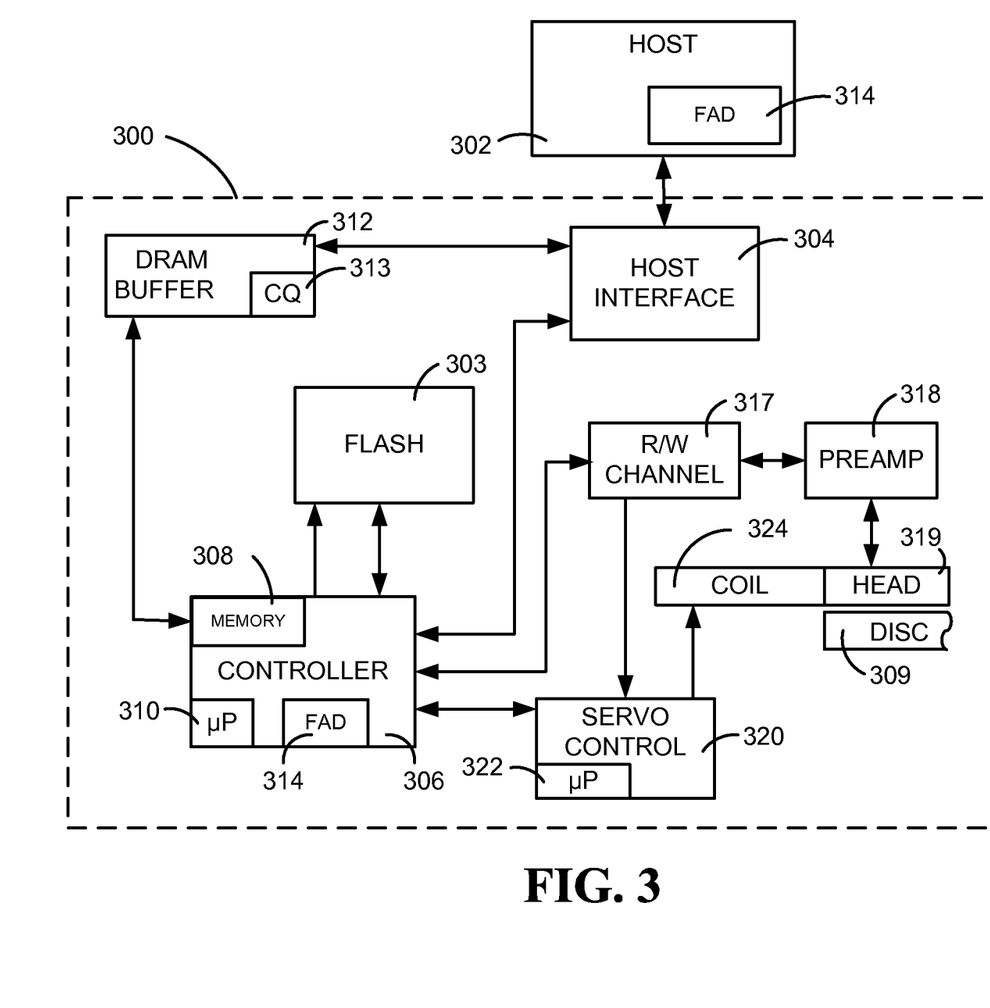
FIG. 3 is a diagram of a an illustrative embodiment of a data storage device employing smart file location.

FIG. 3 is a diagram of another illustrative embodiment of a system for smart file location, generally designated 300. Specifically, FIG. 3 provides a functional block diagram of a disc drive data storage device (DSD) 300. The DSD 300 may be a data storage device such as the device 104 shown in FIG. 1. The data storage device 300 can communicate with a host device 302 (such as the host system 102 shown in FIG. 1) via a hardware/firmware based host interface circuit 304 that may include a connector (not shown) that allows the DSD 300 to be physically removed from the host 302. The buffer 312 can temporarily store user data during read and write operations and can include a command queue (CQ) 313 where multiple pending access operations can be temporarily stored pending execution. A nonvolatile solid state memory 303, such as Flash memory, can be included for additional cache or buffer memory, or to provide additional addressable data storage for the DSD 300. The DSD 300 can include a programmable controller 306 with associated memory 308 and processor 310. In some embodiments, the controller 306 may also include file-aware drivers (FAD) 314, or elements to perform one or more functions describes for FAD herein, such as using file information from the host 302 operating system to assign storage attributes.

Further, FIG. 3 shows the DSD 300 can include a read/write (R/W) channel 317, which can encode data during write operations and reconstruct user data retrieved from disc(s) 309 during read operations. A preamplifier/driver circuit (preamp) 318 can apply write currents to the head(s) 319 and provides pre-amplification of readback signals. A servo control circuit 320 may use servo data to provide the appropriate current to the coil 324 to position the head(s) 319 over the disc(s) 309. The controller 306 can communicate with a processor 322 to move the head(s) 319 to the desired locations on the disc(s) 309 during execution of various pending commands in the command queue 313.

The host 302 (or in some embodiments, the controller 306 or data storage device 300) may be loaded with a system of file-aware device drivers (FAD) 314. The FAD 314 can collect information from the host 302 about files or system threads requesting I/O operations, and use this information to assign storage attributes to the files or threads. These storage attributes may be sent to the DSD 300, which can use the attributes to determine where data should be stored on the disc(s) 309 or other available memory locations. Some important data may be stored in the nonvolatile solid-state cache 303, providing quicker access than to data stored on the disc(s) 309.

File-aware drivers (FAD) can be used to improve the performance of data storage devices (DSDs) by providing information the DSDs can use to better organize files. For example, storage attributes based on information from a host may identify which files are significant and therefore should be relocated in the DSD's storage medium for faster access or reliability. Significant or high value files may mean files that are preferred (e.g. of high importance or value to a user), are accessed frequently, or otherwise important or well-suited to be placed on a portion of a storage medium with particular traits. A determination that files are accessed frequently could be based, for example, on accesses compared to a threshold of accesses verses time elapsed. A file that is accessed more than the threshold amount may be considered frequently accessed, while a file accessed less than the threshold may be considered infrequently accessed.

Figure 4:
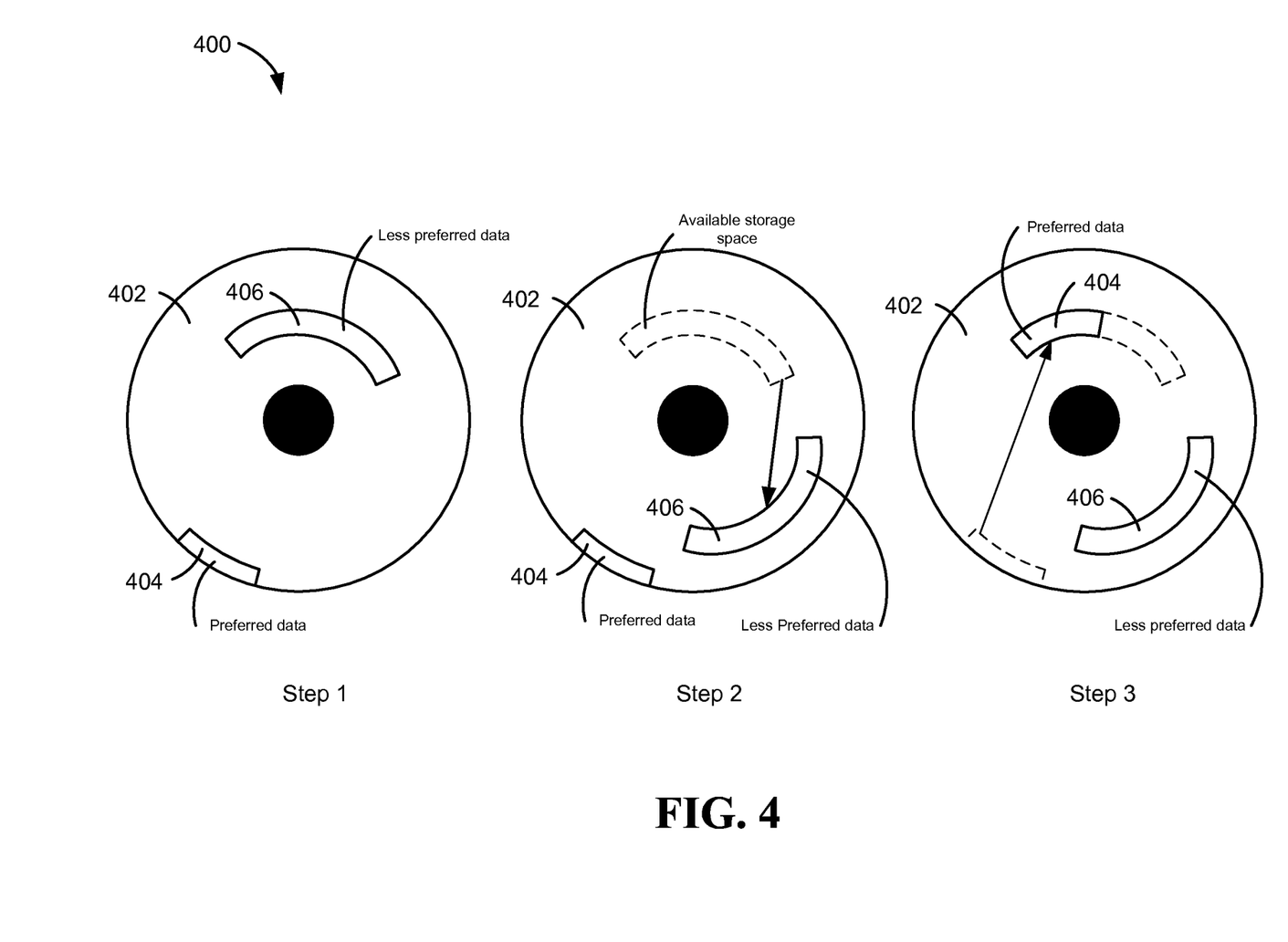
FIG. 4 is a diagram of an illustrative embodiment of smart file location.

Turning now to FIG. 4, a diagram of an illustrative embodiment of smart file location is depicted and generally designated 400. The example embodiment in FIG. 4 depicts data or files stored on a rotatable storage medium 402 of a data storage device (DSD), such as a magnetic disc or optical disc. Data and files may be stored on a rotatable storage medium 402 in a plurality of regions. Examples of regions may include sectors, tracks, physical block addresses, or other units or means of data storage. Even though sectors are frequently used herein, it may be assumed that this is an example and that other types of regions may be used for the systems and methods described. Some discs store data on a plurality of concentric circular tracks, or in some embodiments, one or more tracks that gradually spiral from the outer edge of the disc (e.g. the outer diameter) towards the center of the disc (e.g. the inner diameter). Discs and tracks can further be divided into a plurality of sectors. As the disc spins, data can be read from or written to the disc by a read/write head, which can be positioned over the various tracks by an arm. Where data is stored on the disc 402 can be important for the performance of a (DSD). For example, the time required to spin the disc 402 and position a read/write head may limit the response time of a DSD, and intelligent data placement can reduce time requirements. In some embodiments, different tracks or sectors of a disc 402 can have different properties, such as increased storage density at the expense of reduced reliability. By obtaining more information about various data or files, a DSD may be able to intelligently locate files on the disc 402 based on the importance of the file or frequency with which it is accessed.

FIG. 4 depicts a number of steps for relocating important data to a superior location on a disc 402. Step 1 shows preferred data 404 stored on a track near the outer edge of the disc 402, and less preferred data 406 stored on a track closer to the center of the disc. The data storage device (DSD) may receive an input/output (I/O) request to read or modify the preferred data 404, along with storage attributes identifying the data as preferred. A determination that data is "high value" may be based on a number of factors, such as a selection made by a user, how often the data is accessed, the type of data or accessing program, other factors, or any combination thereof.

After the data 404 is identified as preferred, the DSD may determine that the high value data should be moved to a different location of the disc 402. For example, the track or sector in which the less preferred data 406 is located may provide some benefit, such as faster access or increased reliability. If free space is not available on the desired area of the disc 402 to relocate the preferred data, the DSD may make space available by relocating less valuable data, such as the less preferred data 406. Step 2 in FIG. 4 depicts the less preferred data 406 being copied to available space closer to the outer edge of the disc, thereby freeing the space occupied by the less preferred data in Step 1. Finally, Step 3 depicts the preferred data 404 being moved to the newly freed space.

It will be obvious to one skilled in the art that the example depicted in FIG. 4 is just one method of implementing smart file location. For example, it is not required to relocate preferred data, and the smart file location could be implemented at first write. I.e., if the DSD receives a write command for new preferred data not yet placed on the disc, the DSD could still move less preferred data out of the desired sector or track in order to write the preferred data.

Figure 5:
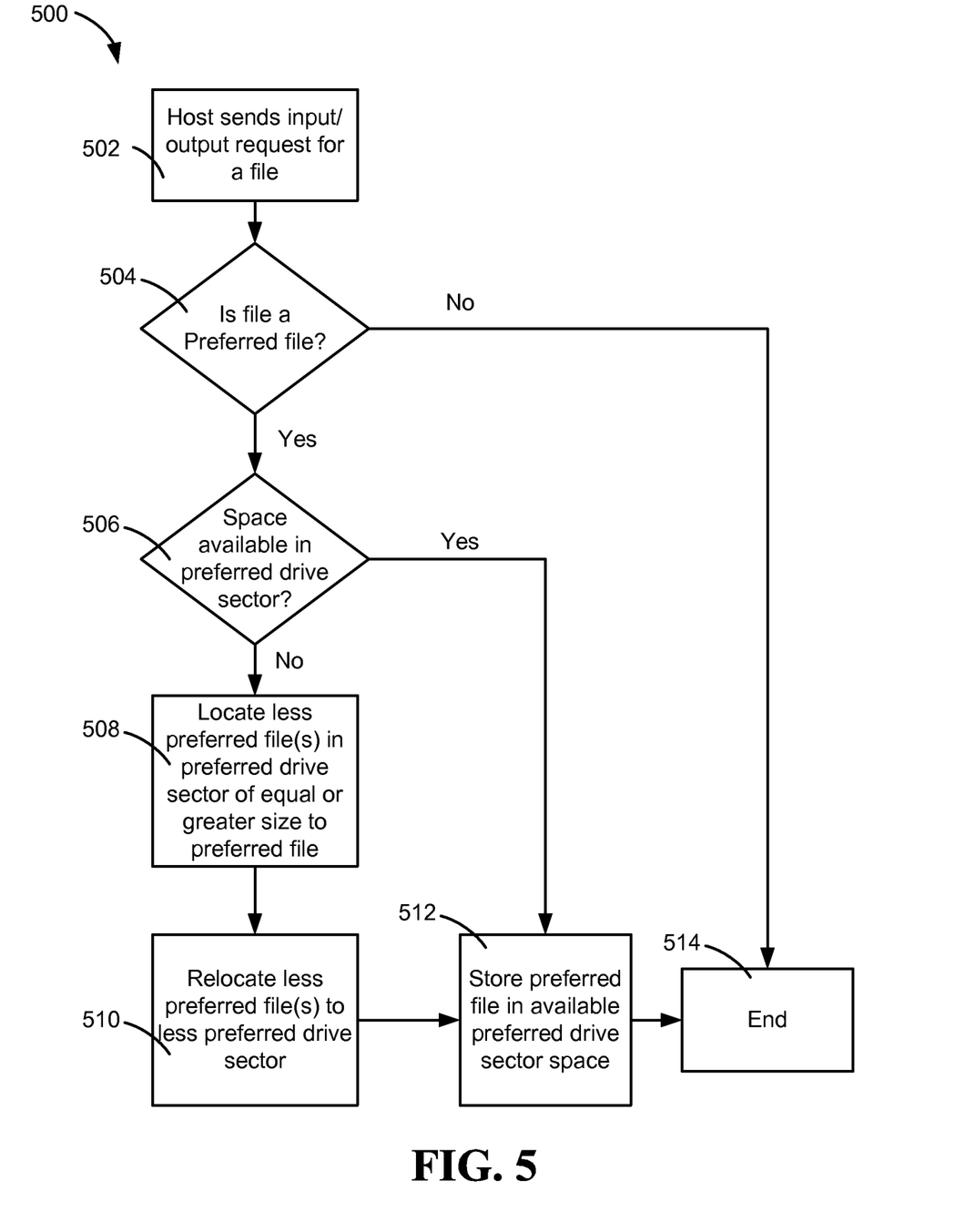
FIG. 5 is a flowchart of an illustrative embodiment of a method of smart file location.

FIG. 5 depicts a flowchart of an illustrative embodiment of a method 500 of smart file location. The depicted method could be used in a system of file-aware drivers such as the system depicted in FIG. 2. The method 500 can involve a host system sending an input or output request (I/O request) to read a file from or write a file to a data storage device (DSD), at 502. This may be a file already stored on the DSD that is being accessed or modified, or it may be a new file to be written to the DSD.

A determination may be made as to whether the file is preferred, at 504. This may be accomplished by file-aware drivers analyzing information about the file obtained from the host system, and then designating the file as preferred in the storage attributes. In another embodiment, storage attributes may be selected based on host file-system information, and the DSD could make the determination as to whether the file is preferred. If the file is not preferred, the analysis may end and the I/O request may be handled without further consideration for smart file location, at 514.

If the file is determined to be preferred at 504, the DSD may determine whether there is sufficient space available on the disc(s) to save the file in a preferred drive sector, at 506. The DSD may analyze space requirements based on the entire file size, or based on the smaller segments of data that may be involved in a single I/O request. Similarly, the DSD may search for free spaces scattered throughout the preferred sector(s) that would provide enough total free space, or it may search for one contiguous space capable of storing the file. If there is not enough contiguous space, the DSD may reorganize files in the preferred sectors to create a contiguous free space.

If sufficient space to store the file in the preferred sector(s) is not found at 506, the DSD may locate less preferred file(s) in the preferred drive sector(s) that are the same total file size as the preferred file or greater, at 508. As these less preferred files will be moved to make room for the preferred file, they must be at least as large as the preferred file. This consideration can also include any available free space in the preferred sectors. For example, if nearly enough free space exists to store the preferred file, only a small less preferred file may need to be moved from the preferred sector(s).

A data storage device may keep track of file "values" in a number of ways, in order to determine less preferred files. For example, a DSD may use a table or other data structure to associate values with the data in any particular logical block address (LBA) or physical address of the disc. In other embodiments, metadata identifying the value of data could be stored along with data on the disc. Different methods are also possible based on the type of "value" that is being analyzed. For example, if the value in question is how often a file is accessed, a DSD could check the last time files were accessed. Files that have not been accessed for a long time may be rated as "low value," and files that are accessed frequently may be rated as "high value."

Once eligible less preferred files have been identified at 508, the less preferred files can be copied to less preferred drive sectors, at 510. A drive may simply move the less preferred files to any available space, move it to any available contiguous space, or move the files based on other factors. For example, if the DSD determines that a file is less preferred for frequency of accesses but preferred for the importance of the data, the DSD may move a file from a sector that is preferred for access time and move it to a sector that is preferred for data storage reliability.

Once free space in the preferred sector(s) has been located, at 506, or has been made available, at 510, the preferred file can be saved in the preferred drive sector(s), at 512. The smart file location analysis may then conclude, at 514.

Smart file location may be implemented by a drive in multiple ways. In some embodiments, a data storage device (DSD) may relocate a file or free space in an preferred sector when an input/output (I/O) request involving a preferred file is first received. In other embodiments, the DSD may perform the requested read or write immediately, and then relocate the preferred file during idle or low work-load periods.

In accordance with various embodiments, the methods described herein may be implemented as one or more software programs running on a computer processor or controller. In accordance with another embodiment, the methods described herein may be implemented as one or more software programs running on a computing device, such as a personal computer that is using a disc drive. Dedicated hardware implementations including, but not limited to, application specific integrated circuits, programmable logic arrays, and other hardware devices can likewise be constructed to implement the methods described herein. Further, the methods described herein may be implemented as a computer readable medium including instructions that when executed cause a processor to perform the methods.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A device comprising:
    a data storage device, including:
        a data storage medium divided into a multitude of regions;
        an interface circuit to receive a first transmission including a specific structured input/output (I/O) command from a host distinct from the data storage device;
        a driver configured to:
            obtain file system information related to the specific structured I/O command in a second transmission from the host, the file system information including information associated with the specific structured I/O command obtained by drivers on the host configured to intercept I/O commands from the host to the data storage device in a process separate from I/O processing of the specific structured I/O command;
            determine storage attributes based on the file system information; and
            store selected data in a preferred region of the data storage medium based on the storage attributes.

2. The device of claim 1 wherein the storage attributes identify selected data as preferred.

3. The device of claim 2 wherein the preferred region has a higher data storage reliability as compared to another region on the data storage medium.

4. The device of claim 1 wherein the storage attributes identify selected data as frequently accessed.

5. The device of claim 4 wherein the preferred region has a faster data access time as compared to another region on the data storage medium.

6. The device of claim 1 wherein the storage attributes are determined based on settings selected by a user to indicate corresponding data is to be stored in the preferred region.

7. The device of claim 2 wherein the driver is further configured to:
    determine if sufficient storage space is available in the preferred region to store the selected data; and
    move secondary data out of the preferred region if sufficient storage space is not available for the selected data.

8. The device of claim 7 wherein the secondary data is identified as less-preferred data than the selected data.

9. The device of claim 8 wherein the secondary data is moved to a less preferred region having a lower data storage reliability than the preferred region.

10. The device of claim 7 wherein the secondary data is identified as infrequently accessed.

11. The device of claim 10 wherein the secondary data is moved to a less preferred region with a slower data access time than the preferred region.

12. The device of claim 1 wherein the driver comprises a controller having software adapted to execute functions of the driver.

13. The device of claim 1 wherein the selected data is moved from a less preferred region of the data storage medium to the preferred region of the data storage medium.

14. The device of claim 1 wherein selected data is data involved in the specific structured I/O command.

15. The device of claim 1 wherein the selected data is not data involved in the specific structured I/O command.

16. The device of claim 1 wherein the data storage medium is a disc data storage medium having a multitude of tracks, wherein different tracks have different data access times and different data storage reliability; and
    the preferred region is selected from the multitude of tracks based on data access rate and data reliability rate.

17. A system comprising:
    a host including:
        a processor configured to execute an operating system;
        a first interface to communicate with a data storage device distinct from the host;
        at least one driver executable by the processor and running in a kernel of the operating system of the host, the at least one driver configured to:
            monitor the operating system of the host for a data input/output request from the host to the data storage device regarding a file;
            intercept the data I/O request to initiate a process separate from I/O processing of the data I/O request, the process including:
                obtain file system information from the operating system about the data I/O request;
                determine storage attributes indicating whether the file is preferred and should be moved to a preferred region of a first memory of the data storage device based on the file system information; and
            provide the storage attributes to the data storage device in a transmission separate from the data I/O request.

18. The system of claim 17 wherein the storage attributes include an indicator of whether the file is preferred, and the data storage device stores the file to the preferred region of the first memory when the storage attributes indicate the file as preferred.

19. The system of claim 18 wherein the preferred region has a faster data access time as compared to another region of the first memory.

20. The system of claim 18 wherein the preferred region has a higher data reliability rate as compared to another region of the first memory.

21. The system of claim 17 further comprising the data storage device including:
    a second interface to communicate with the host;
    the first memory divided into multiple regions;
    a controller configured to:
        receive the storage attributes via the second interface; and
        store the file to the preferred region of the first memory when the storage attributes indicate the file is preferred.

22. A method comprising:
    intercepting, via drivers operating on a host, a data input/output (I/O) request for a specific file sent from the host to a distinct data storage device;

initiating, via the drivers, a process separate from I/O processing of the data I/O request in response to intercepting the data I/O request, the process including:
  obtaining characteristics associated with the specific file from a file system of the host;
  determining if the specific file is preferred based on the characteristics;
  setting storage attributes for the specific file based on the determination;
  providing the storage attributes to the data storage device in a separate transmission from the data I/O request; and
storing, at the data storage device, the specific file to a preferred region of a data storage medium when the specific file is determined to be preferred based on the storage attributes.

23. The method of claim 22 further comprising:
determining the preferred region of the data storage medium to store a preferred file;
determining if there is sufficient available space in the preferred region to store the preferred file;
relocating a less preferred file from the preferred region to a less preferred region if there is not sufficient available space in the preferred region to store the preferred file; and
storing the preferred file to the preferred region of the data storage medium.

24. The method of claim 23 further comprising:
completing the I/O request prior to storing the preferred file to the preferred region; and
storing the preferred file to the preferred region when no read or write request is pending.

* * * * *